(12) United States Patent
Rhoads

(10) Patent No.: US 7,061,510 B2
(45) Date of Patent: Jun. 13, 2006

(54) GEO-REFERENCING OF AERIAL IMAGERY USING EMBEDDED IMAGE IDENTIFIERS AND CROSS-REFERENCED DATA SETS

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 572 days.

(21) Appl. No.: 09/800,093

(22) Filed: Mar. 5, 2001

(65) Prior Publication Data

US 2002/0124171 A1 Sep. 5, 2002

(51) Int. Cl.
*G09G 5/00* (2006.01)
*G06K 9/00* (2006.01)
*H04N 5/76* (2006.01)

(52) U.S. Cl. .................. 345/634; 382/100; 348/231.1
(58) Field of Classification Search ............... 382/100, 382/106, 232; 348/231.1; 345/634; 381/51, 381/54; 713/176
See application file for complete search history.

(56) References Cited

U.S. PATENT DOCUMENTS

| | | | |
|---|---|---|---|
| 4,504,910 A | | 3/1985 | Araki et al. |
| 4,631,678 A | | 12/1986 | Angermiiller et al. |
| 5,214,757 A | * | 5/1993 | Mauney et al. ............. 345/751 |
| 5,329,108 A | | 7/1994 | Lamoure |
| 5,385,371 A | | 1/1995 | Izawa |
| 5,502,576 A | | 3/1996 | Ramsay et al. |
| 5,664,018 A | * | 9/1997 | Leighton ....................... 380/54 |
| 5,764,770 A | | 6/1998 | Schipper et al. |
| 5,799,082 A | | 8/1998 | Murphy et al. |

(Continued)

FOREIGN PATENT DOCUMENTS

| | | |
|---|---|---|
| EP | 953938 A2 * | 3/1999 |
| EP | 0 947 953 A2 | 10/1999 |
| EP | 0 953 938 A2 | 11/1999 |
| EP | 935 872 | 11/2001 |
| EP | 1220152 | 7/2002 |
| GB | 947953 A2 * | 6/1999 |
| GB | 2371934 | 8/2002 |
| JP | 2000 41144 A | 2/2000 |
| WO | WO 99/17537 | 4/1999 |
| WO | WO 01/05075 | 1/2001 |
| WO | WO01/24113 | 4/2001 |
| WO | WO01/39121 | 5/2001 |
| WO | WO01/76253 | 10/2001 |
| WO | WO02/03328 | 1/2002 |
| WO | WO02/33650 | 4/2002 |

OTHER PUBLICATIONS

Natarjan, The Watermarking of Digital Object, Apr. 8, 1999, PCT.
U.S. Appl. No. 09/571,422, filed May 15, 2000, Rhoads et al.
U.S. Appl. No. 09/503,881, filed Feb. 14, 2000, Rhoads et al.
U.S. Appl. No. 10/371,995, filed Feb. 20, 2003, Rhoads et al.
Bender et al., "Techniques for Data Hiding," SPIE vol. 2420, Jan. 1995, pp. 164–173.

(Continued)

*Primary Examiner*—Matthew C. Bella
*Assistant Examiner*—Anthony J Blackman
(74) *Attorney, Agent, or Firm*—Digimarc Corporation

(57) ABSTRACT

Digital watermarking technology is used in conjunction with map data, such as is acquired by satellite and other aerial sensors, and as may be generated from databases based on such aerial data. The watermarks can be used, e.g., to track meta data, provide serialization and forensic tracing, and various other benefits. The disclosure also contemplates that incoming imagery is automatically geo-referenced and combined with previously-collected data sets so as to facilitate generation of revised composite maps.

2 Claims, 2 Drawing Sheets

U.S. PATENT DOCUMENTS

| | | | |
|---|---|---|---|
| 5,812,962 A | | 9/1998 | Kovac |
| 5,825,892 A | | 10/1998 | Braudaway et al. |
| 5,861,841 A | | 1/1999 | Gildea et al. |
| 5,864,623 A | | 1/1999 | Messina et al. |
| 5,889,868 A | * | 3/1999 | Moskowitz et al. ........ 713/176 |
| 5,889,898 A | | 3/1999 | Koren et al. |
| 5,901,178 A | | 5/1999 | Lee et al. |
| 5,919,730 A | | 7/1999 | Gasper et al. |
| 5,943,422 A | * | 8/1999 | Van Wie et al. ............... 705/54 |
| 5,958,051 A | | 9/1999 | Renaud et al. .............. 713/200 |
| 5,964,821 A | | 10/1999 | Brunts et al. |
| 5,987,136 A | | 11/1999 | Schipper et al. |
| 5,990,826 A | | 11/1999 | Mitchell |
| 6,005,936 A | | 12/1999 | Shimizu ..................... 713/176 |
| 6,031,914 A | | 2/2000 | Tewfik et al. |
| 6,081,827 A | | 6/2000 | Reber et al. |
| 6,088,394 A | | 7/2000 | Maltby |
| 6,122,043 A | * | 9/2000 | Barley ......................... 382/233 |
| 6,122,403 A | | 9/2000 | Rhoads |
| 6,148,091 A | | 11/2000 | DiMaria |
| 6,175,639 B1 | | 1/2001 | Satoh et al. |
| 6,181,802 B1 | | 1/2001 | Todd |
| 6,185,312 B1 | | 2/2001 | Nakamura et al. |
| 6,243,480 B1 | | 6/2001 | Zhao et al. ................. 382/100 |
| 6,246,777 B1 | | 6/2001 | Agarwal et al. |
| 6,263,438 B1 | | 7/2001 | Walker et al. .............. 713/178 |
| 6,282,362 B1 | * | 8/2001 | Murphy et al. ............... 386/46 |
| 6,282,648 B1 | | 8/2001 | Walker et al. |
| 6,289,453 B1 | | 9/2001 | Walker ....................... 713/175 |
| 6,301,360 B1 | | 10/2001 | Bocionek et al. |
| 6,310,956 B1 | | 10/2001 | Morito et al. |
| 6,311,214 B1 | | 10/2001 | Rhoads |
| 6,320,829 B1 | | 11/2001 | Matsumoto et al. |
| 6,324,573 B1 | | 11/2001 | Rhoads ....................... 709/217 |
| 6,332,149 B1 | | 12/2001 | Warmus et al. |
| 6,332,193 B1 | | 12/2001 | Glass et al. ................. 713/170 |
| 6,341,350 B1 | | 1/2002 | Miyahara et al. |
| 6,343,138 B1 | | 1/2002 | Rhoads ....................... 382/100 |
| 6,351,439 B1 | | 2/2002 | Miwa et al. |
| 6,408,082 B1 | | 6/2002 | Rhoads et al. |
| 6,408,331 B1 | | 6/2002 | Rhoads ....................... 709/217 |
| 6,411,725 B1 | | 6/2002 | Rhoads ....................... 382/100 |
| 6,427,020 B1 | | 7/2002 | Rhoads ....................... 382/100 |
| 6,463,416 B1 | | 10/2002 | Messina |
| 6,493,514 B1 | | 12/2002 | Stocks et al. ............... 396/311 |
| 6,498,984 B1 | | 12/2002 | Agnew et al. |
| 6,504,571 B1 | * | 1/2003 | Narayanaswami et al. ..................... 348/231.99 |
| 6,505,160 B1 | | 1/2003 | Levy et al. ................. 704/270 |
| 6,522,770 B1 | | 2/2003 | Seder et al. ................ 382/100 |
| 6,526,155 B1 | * | 2/2003 | Wang et al. ................ 382/100 |
| 6,529,615 B1 | | 3/2003 | Hendrickson et al. |
| 6,532,541 B1 | | 3/2003 | Chang et al. ............... 713/176 |
| 6,542,927 B1 | | 4/2003 | Rhoads ....................... 709/217 |
| 6,590,996 B1 | * | 7/2003 | Reed et al. ................. 382/100 |
| 6,650,761 B1 | | 11/2003 | Rodriguez et al. |
| 2001/0001854 A1 | | 5/2001 | Schena et al. |
| 2001/0019611 A1 | | 9/2001 | Hilton |
| 2001/0022667 A1 | | 9/2001 | Yoda |
| 2001/0023421 A1 | | 9/2001 | Numao et al. |
| 2001/0026377 A1 | | 10/2001 | Ikegami |
| 2001/0026616 A1 | | 10/2001 | Tanaka |
| 2001/0026629 A1 | | 10/2001 | Oki |
| 2001/0030759 A1 | | 10/2001 | Hayashi et al. |
| 2001/0031064 A1 | | 10/2001 | Donescu et al. |
| 2001/0033674 A1 | | 10/2001 | Chen et al. |
| 2001/0034835 A1 | | 10/2001 | Smith |
| 2001/0039546 A1 | | 11/2001 | Moore et al. |
| 2001/0046307 A1 | | 11/2001 | Wong |
| 2001/0051964 A1 | | 12/2001 | Warmus et al. |
| 2002/0001395 A1 | | 1/2002 | Davis et al. |
| 2002/0002679 A1 | | 1/2002 | Murakami et al. |
| 2002/0006212 A1 | | 1/2002 | Rhoads et al. |
| 2002/0009209 A1 | | 1/2002 | Inoue et al. |
| 2002/0044690 A1 | | 4/2002 | Burgess |
| 2002/0046178 A1 | | 4/2002 | Morito et al. |
| 2002/0059520 A1 | | 5/2002 | Murakami et al. |
| 2002/0069370 A1 | | 6/2002 | Mack |
| 2002/0080396 A1 | | 6/2002 | Silverbrook et al. |
| 2002/0095586 A1 | | 7/2002 | Doyle et al. |
| 2002/0095601 A1 | | 7/2002 | Hind et al. |
| 2002/0106105 A1 | | 8/2002 | Pelly et al. |
| 2002/0122564 A1 | | 9/2002 | Rhoads et al. |
| 2002/0124171 A1 | | 9/2002 | Rhoads |
| 2002/0124173 A1 | | 9/2002 | Stone |
| 2002/0126869 A1 | * | 9/2002 | Wang et al. ................. 382/100 |
| 2002/0135600 A1 | | 9/2002 | Rhoads |
| 2002/0136531 A1 | | 9/2002 | Harradine |
| 2002/0147910 A1 | | 10/2002 | Brundage et al. |
| 2002/0159765 A1 | | 10/2002 | Maruyama et al. |
| 2002/0168069 A1 | | 11/2002 | Tehranchi et al. |
| 2003/0011684 A1 | | 1/2003 | Narayanaswami |
| 2003/0012562 A1 | | 1/2003 | Lawandy et al. |
| 2003/0032033 A1 | | 2/2003 | Anglin et al. |
| 2003/0040326 A1 | | 2/2003 | Levy et al. |
| 2003/0048908 A1 | | 3/2003 | Hamilton |
| 2003/0053654 A1 | | 3/2003 | Patterson et al. |
| 2003/0069693 A1 | | 4/2003 | Snapp et al. |
| 2003/0074556 A1 | | 4/2003 | Chapman et al. |
| 2003/0090690 A1 | | 5/2003 | Katayama et al. |

OTHER PUBLICATIONS

Caronni, "Assuring Ownership Rights for Digital Images," Published in the Proceedings of 'Reliable IT Systems,' VIS '95, HH. Brüggemann and W. Gerhardt–Häckl (Ed.), Vieweg Publishing Company, Germany, 1995, Jun. 14, 1994, 10 pages.

Friedman, "The Trustworthy Digital Camera: Restoring Credibility to the Photographic Image," IEEE Transactions on consumer Electronics, vol. 39, No. 4, Nov., 1993, pp. 905–910.

Koch et al., "Digital Copyright Labeling: Providing Evidence of Misuse and Tracking Unauthorized Distribution of Copyrighted Materials," OASIS Magazine, Dec. 1995, 3 pages.

Manjunath, "Image Processing in the Alexandria Digital Library Project," Proc. IEEE Int. Form on Research and Tech. Advances in Digital Libraries—ADL '98, pp. 180–187.

Yeung et al., "Digital Watermarks: Shedding Light on Invisible," Nov.–Dec. 1998, IEEE Micro vol. 18, No. 6, pp. 32–41.

Zhao et al., "Embedding Robust Labels Into Labels for Copyright Protection," Proc. of the International Congress on Intellectual Property Rights for Specialized Information, Knowledge and New Technologies (Vienna, Austria) Aug. 21–25, 1995, 10 pages.

Zhao, "Digital Watermark Mobile Agents," Proc. of NISSC'99, Arlington, VA, Oct. 18–21, 1999, pp. 138–146.

Seybold Seminars: Keynote: Digital Imaging Day, comments from panel including Daniel Carp, panel discussion occurring on Aug. 28, 2000 (8 pages).

http://web.archive.org/web/20010305033241/http://www.kodak.com/country/US/en/corp/researchDevelopment/technologyFeatures/digitalWatermarking.shtml, "Invisible Watermarking", archive date of Mar. 5, 2001 (4 pages, including Internet Archive Wayback Machine cover page).

Daniel A. Carp, "Seven wonders of the imaging world", International Contact, Oct./Nov. 2000, pp. 36/I–36/IV.

"Digital Watermarking, The Unssen Advantage" Geo Informatics, Jun. 2001 (3 pages).

Seybold Seminars: Keynote: Digital Imaging Day, comments form panel including Daniel Carp, panel discussion occurring on Aug. 28, 2000 (8 pages).

http://web.archive.org/web/20010305033241/http://www.kodak.com/country/US/en/corp/researchDevelopment/technologyFeatures/digitalWatermarking.shtml, "Invisible Watermarking", archive date of Mar. 5, 2001 (4 pages, including Internet Archive Wayback Machine cover page).

Daniel A. Carp, "Seven wonders of the imaging world", International Contact, Oct./Nov. 2000, pp. 36/I–36/IV.

"Digital Watermarking, The Unseen Advantage" Geo Informatics, Jun. 2001 (3 pages).

* cited by examiner

GEO-REFERENCING OF AERIAL IMAGERY USING EMBEDDED IMAGE IDENTIFIERS AND CROSS-REFERENCED DATA SETS

FIELD OF THE INVENTION

The present invention relates to image management and processing, and is particularly illustrated in the context of near real-time management of satellite and other aerial imagery, and automatic revision of map data based on such imagery.

BACKGROUND AND SUMMARY OF THE INVENTION

Acquisition of aerial imagery traces its history back to the Wright brothers, and is now commonly performed from satellite and space shuttle platforms in addition to aircraft.

While the earliest aerial imagery relied on conventional film technology, a variety of electronic sensors are now more commonly used. Some collect image data corresponding to specific visible, UV or IR frequency spectra (e.g., the MultiSpectral Scanner and Thematic Mapper used by the Landsat satellites). Others use wide band sensors. Still others use radar or laser systems (sometimes stereo) to sense topological features in 3 dimensions.

The quality of the imagery has also constantly improved. Some satellite systems are now capable of acquiring image and topological data having a resolution of less than a meter. Aircraft imagery, collected from lower altitudes, provides still greater resolution.

For expository convenience, the present invention is particularly illustrated in the context of a Digital Elevation Model (DEM). A DEM, essentially, is an "elevation map" of the earth (or part thereof). One popular DEM is maintained by the U.S. Geological Survey and details terrain elevations at regularly spaced intervals over most of the U.S. More sophisticated DEM databases are maintained for more demanding applications, and can consider details such as the earth's pseudo pear shape, in addition to more localized features. Resolution of sophisticated DEMs can get well below one meter cross-wise, and down to centimeters or less in actual elevation. DEMs—with their elevation data—are sometimes supplemented by albedo maps (sometimes termed texture maps, or reflectance maps) that detail, e.g., a grey scale value for each pixel in the image, conveying a photographic-like representation of an area.

There is a large body of patent literature that illustrates DEM systems and technology. For example:

U.S. Pat. No. 5,608,405 details a method of generating a Digital Elevation Model from the interference pattern resulting from two co-registered synthetic aperture radar images.

U.S. Pat. No. 5,926,581 discloses a technique for generating a Digital Elevation Model from two images of ground terrain, by reference to common features in the two images, and registration mapping functions that relate the images to a ground plane reference system.

U.S. Pat. Nos. 5,974,423, 6,023,278 and 6,177,943 disclose techniques by which a Digital Elevation Model can be transformed into polygonal models, thereby reducing storage requirements, and facilitating display in certain graphics display systems.

U.S. Pat. Nos. 5,995,681 and 5,550,937 detail methods for real-time updating of a Digital Elevation Model (or a reference image based thereon), and are particularly suited for applications in which the terrain being mapped is not static but is subject, e.g., to movement or destruction of mapped features. The disclosed arrangement iteratively cross-correlates new image data with the reference image, automatically adjusting the geometry model associated with the image sensor, thereby accurately co-registering the new image relative to the reference image. Areas of discrepancy can be quickly identified, and the DEM/reference image can be updated accordingly.

U.S. Pat. No. 6,150,972 details how interferometric synthetic aperture radar data can be used to generate a Digital Elevation Model.

From systems such as the foregoing, and others, a huge quantity of aerial imagery is constantly being collected. Management and coordination of the resulting large data sets is a growing problem.

In accordance with one aspect of the present invention, digital watermarking technology is employed to help track such imagery, and can also provide audit trail, serialization, anti-copying, and other benefits.

In accordance with another aspect of the invention, incoming imagery is automatically geo-referenced and combined with previously-collected data sets so as to facilitate generation of up-to-date DEMs and maps.

The foregoing and additional features and advantages of the present invention will be more readily apparent from the following detailed description.

Figure 1:
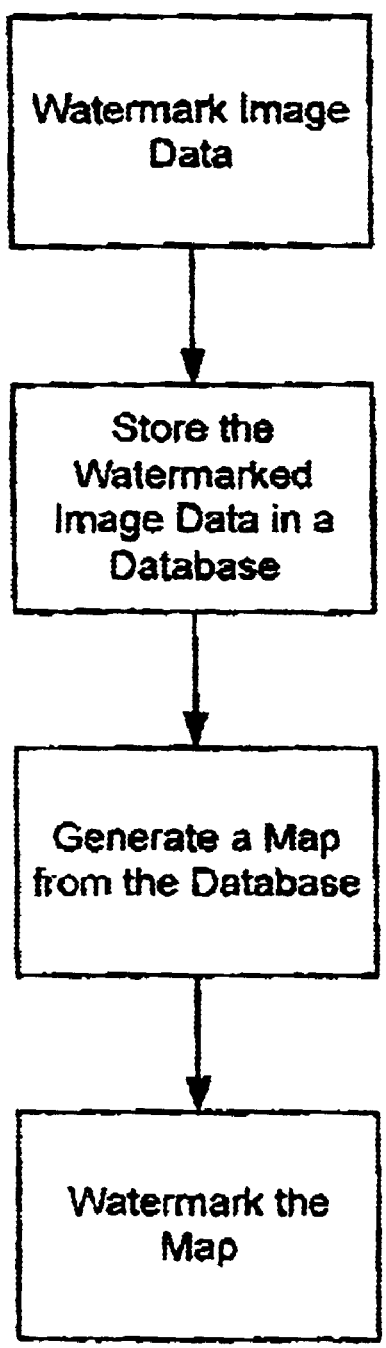
FIG. 1 illustrates a watermarking method and generally corresponds to claim 1.
Figure 2:
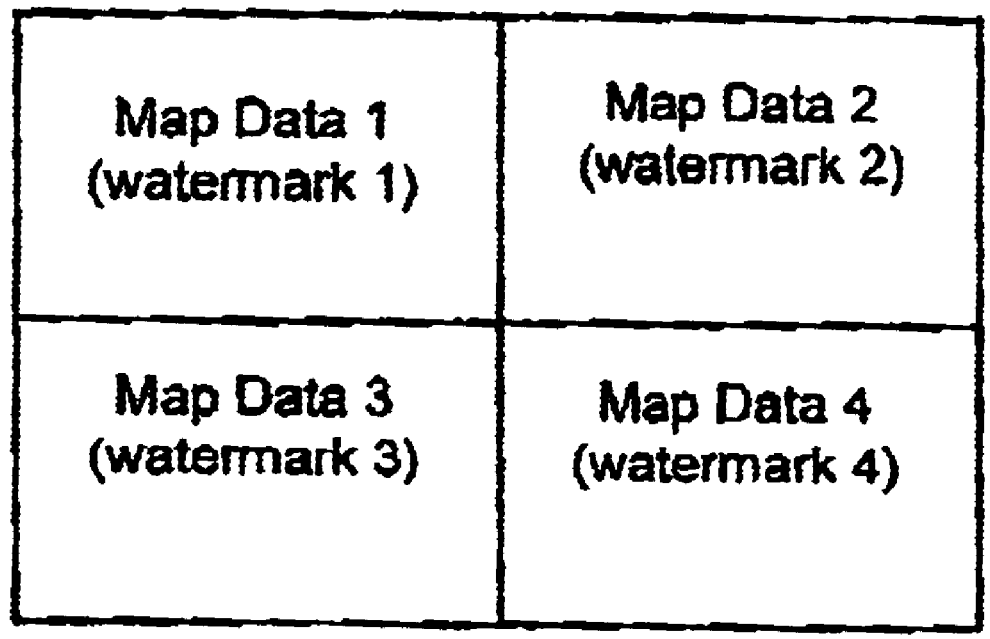
FIG. 2 illustrates composite map and generally corresponds to claim 2.

DETAILED DESCRIPTION (For expository convenience, the following specification focuses on satellite "imagery" to illustrate the principles of the invention. The principles of the invention, however, are equally applicable to other forms of aerial surveillance data and other topographic/mapping information. Accordingly, the term "image" should be used to encompass all such other data sets, and the term "pixel" should be construed to encompass component data from such other data sets.)

When new aerial imagery is received, it is generally necessary to identify the precise piece of earth to which it corresponds. This operation, termed "georeferencing" or "geocoding," can be a convoluted art and science.

In many systems, the georeferencing begins with a master reference system (e.g., latitude and longitude) that takes into account the earth's known deformities from a sphere. Onto this reference system the position of the depicted region is inferred, e.g., by consideration of the satellite's position and orientation (ephemeris data), optical attributes of the satellite's imaging system, and models of the dispersion/refraction introduced by the earth's atmosphere.

In applications where precise accuracy is required, the foregoing, "ephemeris," position determination is refined by comparing features in the image with the placement of known features on the earth's surface (e.g., buildings and other man-placed objects, geological features, etc.) and compensating the georeference determination accordingly. Thus, for example, if the actual latitude and longitude of a building is known (e.g., by measurement from a ground survey—"ground truth"), and the corresponding latitude and longitude of that building as indicated in the georeferenced satellite imagery is different, the reference system applied to the satellite data can be altered to achieve a match. (Commonly, three or more such ground truth points are used so as to assure accurate correction.)

Ground-truthing is a tedious undertaking. While computer methods can be used to facilitate the process, the best ground truth correction of imagery generally requires some human involvement. This is impractical for many applications.

Let us consider the basic principle of cost/meter as a useful metric, and imagine that various applications for exploiting satellite data are willing to pay different amounts in order to achieve given levels of geocoding accuracy. The following disclosure hypothesizes that there are ways (possibly novel, alluding to the idea that the author lacks detailed knowledge of the state of the art, and presumes no novelty nor lack thereof) to utilize all collected satellite data, properly identified and stored as a huge intercorrelated reference system—itself anchored by ground truth data—as a means to automatically geocode incoming raw pixels to the massive overall data set. The accuracy of this automated geocoding would hopefully be higher than that obtainable from ephemeris-type systems alone, but would probably be less accurate than "manually instigated" precision geocoding based directly on ground truth. The hope and goal would be that a lower core cost/meter geocoding accuracy could be achieved.

Such a system may involve the following elemental components:
1) An ideal sphere with an arbitrary time origin (as the starting point for the DEM model)
2) A time-evolving DEM
3) A time-evolving master-correlate albedo texture map
    3A) A finite layered index map, organizing current raw data contributors to map
4) Ground Truth Data
5) Nominal ephemeris data per contiguous datastream
The ongoing automation process includes:
1) Creating initial sphere, DEM, and texture map using existing ground truth
2) Creating a layered index map
3) Each newly acquired datastream is cloud-masked, DEM-projection-and refraction-corrected
4) The masked-corrected data—using nominal ephemeris data as a starting point—is correlated to a master DEM/albedo map, itself projected along nominal ephemeris
5) The quality of the new data is evaluated, and incrementally added to the master albedo map and index map if it is deemed acceptable
    5A) a pseudo infinite impulse response (based on time and quality of data) in coming up with current albedo map pixel value (omnidirectional pixel value)

At the core of building the albedo-map (and also the DEM) is the need to always track its inputs for several reasons:
  redundant checking for accuracy and veracity of inputs;
  indexing of what data is contributing to the master albedo map;
  coordination of data from similar or even vastly different sources, all contributing to either the master maps or to existing relational databases.
As detailed below, watermarking can play an important role in the achieving these objects.

The foregoing will be clearer from the following.

Consider an illustrative DEM system with a 10 meter horizontal resolution, and featuring continual refresh and georeferencing. At two bytes per pixel, and a model size of 4M by 2M pixels, the model comprises 16 Terabytes of data. The albedo map is on the same order of resolution, with the same data storage requirements. The database storing this information desirably is arranged to easily graph necessary correlation scenes.

Presume an existing master DEM and albedo map. These may have been formed by a dozen or more redundant component data sets (e.g., aerial images, ground surveys), acquired over the previous days, months or years, that have been composited together to yield the final DEM/map ("model").

Now imagine a new satellite image is acquired corresponding to part of the region represented by the master model. The particular terrain depicted by the satellite image can be inferred from ephemeris and other factors, as noted above. By such techniques, the location of the depicted image on the earth's surface (e.g., the latitude and longitude of a point at the center of the image) may be determined within an error of, say 5–500 meters. This is a gross geo-referencing operation.

Next a fine geo-referencing operation is automatically performed, as follows. An excerpt of the master model is retrieved from the database—large enough to encompass the new image and its possible placement error (e.g., an area centered on the same latitude/longitude, but extending 250 meters further at each edge). A projective image is formed from this master DEM/map excerpt, considering, e.g., the satellite's position and atmospheric effects, thereby simulating how the master model would look to the satellite, taking into account—where possible—the particular data represented by the satellite image, e.g., the frequency bands imaged, etc. (The albedo map may be back-projected on the 3D DEM data in some arrangements to augment the realism of the projective image.)

The projective image formed from the master DEM/map excerpt differs somewhat from the image actually acquired by the satellite. This difference is due, in part, to the error in the gross geo-referencing. (Other differences may arise, e.g., by physical changes in the region depicted since the master DEM/map was compiled.)

The projective image is next automatically correlated with the satellite image. A variety of known mathematical techniques can be utilized in this operation, including dot product computation, transforming to spatial frequency domain, convolution, etc. In a lay sense, the correlation can be imagined as sliding one map over the other until the best registration between the two images is obtained.

From the correlation operation, the center-to-center offset between the excerpt of the master DEM/map, and the satellite image, is determined. The satellite image can thereby be accurately placed in the context of the master model. Depending on system parameters, a fine placement accuracy of, e.g., between 5 cm and 5 meters (i.e., sub-pixel accuracy) may be achieved.

(In some embodiments, affine transformations can be applied to the satellite data to further enhance the correlation. E.g., particular geological or other features in the two data sets can be identified, and the satellite data (e.g., map or image) can then be affine-transformed so that these features correctly register.)

With the satellite image thus finely geo-referenced to the master DEM/map, it can be transformed (e.g., resampled) as necessary to correspond to the (typically rectilinear) reference system used in the master model, and then used to refine the data represented in the model. Buildings or other features newly depicted in the satellite image, for example, can be newly represented in the master model. The master model can be similarly updated to account for erosion and other topological changes revealed by the new satellite image.

Part of the finely geo-referenced satellite data may be discarded and not added to the master model, e.g., due to cloud cover or other obscuring phenomena. The remaining data is assessed for its relative quality, and this assessment is used in determining the relative weight that will be given the new satellite data in updating the master model.

In one embodiment, the finely geo-referenced satellite data is segmented into regions, e.g., rectangular patches corresponding to terrain 1000 meters on a side, and each patch is given its own weighting factor, etc. In a system with 10 meter resolution (i.e., a pixel size of 10 m$^2$, the patch thus comprises an array of 100×100 pixels. (In some embodiments, the fine geo-referencing is done following the segmentation of the image, with each patch separately correlated with a corresponding area in the master model.) Each patch may take the form of a separate data file.

When the new satellite data is added to update the master model, old data may be discarded so that it no longer influences the model. Consider an area that is imaged monthly by a satellite. Several months' worth of image data may be composited to yield the master model (e.g., so cloud cover that obscured a region in the latest fly-over does not leave part of the model undefined). As each component image data gets older, it may be given less and less weight, until it no longer forms any part of the master model. (Other component data, in contrast, may be retained for much longer periods of time. Map information collected by ground surveys or other forms of "ground truth" information may fall into this category.)

The master model may be physically maintained in different ways. In one exemplary arrangement, a database stores the ten sets of data (e.g., acquired from different sources, or at different times) for each 1000×1000 meter patch. When interrogated to produce a map or other data, the database recalls the 10 data sets for each patch, and combines them on the fly according to associated weighting factors and other criteria (e.g., viewing angle) to yield a net representation for that patch. This composite patch is then combined (e.g., graphically stitched) with other adjoining, similarly-formed composite patches, to yield a data set representing the desired area.

In another embodiment, the component sets of image data are not separately maintained. Rather, each new set of image data is used to update a stored model. If the new image data is of high quality (e.g., good atmospheric seeing conditions, and acquired with a high resolution imaging device), then the new data may be combined with the existing model with a 20/80 weighting (i.e., the existing model is given a weight four-times that of the new data). If the new image data is of low quality, it may be combined with the existing model with a 5/95 weighting. The revised model is then stored, and the new data needn't thereafter be tracked.

(The foregoing examples are gross simplifications, but serve to illustrate a range of approaches.)

The former arrangement—with the component data stored—is preferred for many applications, since the database can be queried to yield different information. For example, the database can be queried to generate a synthesized image of terrain as it would look at a particular time of day, imaged in a specified IR frequency band, from a specified vantage point.

It will be recognized that a key requirement—especially of the former arrangement—is a sophisticated data management system. For each data set representing a component 1000×1000 meter patch stored in the database, a large quantity of ancillary data (meta data) must be tracked. Among this meta data may be a weighting factor (e.g., based on seeing conditions and sensor attributes), an acquisition date and time (from which an age-based weighting factor may be determined), the ID of the sensor/satellite that acquired that data, ephemeris data from the time of acquisition, the frequency band imaged, the geo-referenced position of the patch (e.g., latitude/longitude), etc., etc. (Much of this data may be common to all patches from a single image.)

Classically, each component source of data to the system (here referred to as an "image" for expository convenience) is associated with a unique identifier. Tapes and data files, for example, may have headers in which this identifier is stored. The header may also include all of the meta data that is to be associated with that file. Or the identifier can identify a particular database record at which the corresponding meta data is stored. Or hybrid approaches can be used (e.g., the header can include a file identifier that identifies a data base record, but also includes data specifying the date/time of data acquisition).

In the final analysis, any form of very reliable image identification may suffice for use in such a system. The header approach just-discussed is straightforward. Preferable, however, is to embed one or more identifiers directly into the image data itself (i.e., "in band" steganographic encoding using digital watermarking). A well-designed watermarking name-space can in fact become a supra-structure over several essentially independent serial numbering systems already in use across a range of satellite sources. Moreover, rudimentary georeferencing information can actually be embedded within the watermark name-space.

For example, on initial acquisition, an initial watermark can be applied to satellite imagery detailing the ephemeris based gross georeferencing. Once the image has been finely georeferenced, the existing watermark can either be overlaid or overwritten with a new watermark containing the geo-referencing information (e.g., "center lat: N34.4324352, long: W87.2883134; rot from N/S: 3.232; x2.343, y2.340, dx0.123, dy493, etc."). These numbers essentially encode georeferencing info including projective and atmospheric distortions, such that when this image is DEM-projection corrected, high accuracy should be achieved.

Another way to explain the need for watermarking might be the following: Pity the first grade teacher who has a class of young upstarts who demand a lengthy dissertation on why they should simply put their names on their papers. The uses defy even common sense arguments, and it is no different with watermarks . . . sear in a serial number and just keep track of it.

The assignee's U.S. Pat. No. 6,122,403, and pending application Ser. No. 09/503,881, detail suitable digital watermarking techniques in which values of pixels, e.g., in a 100×100 pixel patch, can be slightly altered so as to convey a plural-bit payload, without impairing use of the pixel data for its intended purpose. The payload may be on the order of 50–250 bits, depending on the particular form of encoding (e.g., convolution, turbo, or BCH coding can be employed to provide some error-correcting capability), and the number of bits per pixel. Larger payloads can be conveyed through larger image patches. (Larger payloads can also be conveyed by encoding the information is a less robust fashion, or by making the encoding more relatively visible.)

The watermark payload can convey an image identifier, and may convey other meta data as well. In some systems, the component image files are tagged both by digital watermark identifiers and also by conventional out-of-band techniques, such as header data, thereby affording data redundancy.

Watermarking may be performed in stages, at different times. For example, an identifier can be watermarked into an image relatively early in the process, and other information (such as finely geo-referenced latitude/longitude) can be watermarked later. A single watermark can be used, with different payload bits written at different times. (In watermark systems employing pseudo-random data or noise (PN), e.g., to randomize some aspect of the payload's encoding, the same PN data can be used at both times, with different payload bits encoded at the different times.)

Alternatively, different watermarks can be applied to convey different data. The watermarks can be of the same general type (e.g., PN based, but using different PN data). Or different forms of watermark can be used (e.g., one that encodes by adding an overlay signal to a representation of the image in the pixel domain, another that encodes by slightly altering DCT coefficients corresponding to the image in a spatial frequency domain, and another that encodes by slightly altering wavelet coefficients corresponding to the image).

In some multiple-watermarking approaches, a first watermark is applied before the satellite image is segmented into patches. A later watermark can be applied after segmentation. (The former watermark is typically designed so as to be detectable from even small excerpts of the original image.)

A watermark can be applied by the imaging instrument. In some embodiments, the image is acquired through an LCD optical shutter, or other programmable optical device, that imparts an inconspicuous patterning to the image as it is captured. (One particular optical technique for watermark encoding is detailed in U.S. Pat. No. 5,930,369.) Or the watermarking can be effected by systems in the satellite that process the acquired data prior to transmission to a ground station. In some systems, the image data is compressed for transmission—discarding information that is not important. The compression algorithm can discard information in a manner calculated so that the remaining data is thereby encoded with a watermark.

The ground station receiving the satellite transmission can likewise apply a watermark to the image data. So can each subsequent system through which the data passes.

As indicated, the watermark(s) can identify the imaging system, the date/time of data acquisition, satellite ephemeris data, the identity of intervening systems through which the data passed, etc. One or more watermarks can stamp the image with unique identifiers used in subsequent management of the image data, or in management of meta data associated with the image.

A watermark can also serve a function akin to a hyperlink, e.g., as detailed in application Ser. No. 09/571,422. For example, a user terminal can permit an operator to right-click on a region of interest in a displayed image. In response, the system can respond with a menu of options—one of which is Link Through Watermark(s). If the user selects this option, a watermark detection function is invoked that decodes a watermark payload from the displayed image (or from a portion of the image in which the operator clicked). Using data from the decoded watermark payload, the terminal interrogates a database for a corresponding record. That record can return to the terminal certain stored information relating to the displayed image. For example, the database can present on the terminal screen a listing of hyperlinks leading to other images depicting the same area. By clicking on such a link, the corresponding image is displayed. Or the database can present, on the user terminal screen, the meta-data associated with the image.

In some embodiments, watermarks in component images may carry-through into the master DEM/map representation. If an excerpt of the master DEM/map is displayed, the user may invoke the Link Through Watermark(s) function. Corresponding options may be presented. For example, the user may be given the option of viewing each of the component images/data sets that contributed to the portion of the master model being viewed.

(It will be recognized that a variety of user interface techniques other than right-clicking, and selecting from a menu of options thereby displayed, can be employed. That interface is illustrative only.)

In some embodiments, a watermark can be applied to each DEM/map from the master database as it is retrieved and output to the user. The watermark can indicate (i.e., by direct encoding, or by pointing to a database record) certain data related to the compiled data set, such as the date/time of creation, the ID of the person who queried the database, the component datasets used in preparing the output data, the database used in compiling the output data, etc. Thereafter, if this output data is printed, or stored for later use, the watermark persists, permitting this information to be later ascertained.

Watermarks can be applied to any data set (e.g., a satellite image, or a map generated from the master database) for forensic tracking purposes. This is particularly useful where several copies of the same data set are distributed through different channels (e.g., provided to different users). Each can be "serialized" with a different identifier, and a record can be kept of which numbered data set was provided to which distribution channel. Thereafter, if one of the data sets appears in an unexpected context, it can be tracked back to the distribution channel from which it originated.

Some watermarks used in the foregoing embodiments can be "fragile." That is, they can be designed to be lost, or to degrade predictably, when the data set into which it is embedded is processed in some manner. Thus, for example, a fragile watermark may be designed so that if an image is JPEG compressed and then decompressed, the watermark is lost. Or if the image is printed, and subsequently scanned back into digital form, the watermark is corrupted in a foreseeable way. (Fragile watermark technology is disclosed, e.g., in applications Ser. Nos. 09/234,780, 09/433,104, 09/498,223, 60/198,138, 09/562,516, 09/567,405, 09/625,577, 09/645,779, and 60/232,163.) By such arrangements it is possible to infer how a data set has been processed by the attributes of a fragile watermark embedded in the original data set.

Assuming that early testing proves out that the addition of "watermarking energy" into the normal workflow of satellite imaging systems does not materially disturb the function of most of the output of that system, nevertheless certain "watermark removal" tools can be built to alleviate any problems in cases where unacceptable impact is identified. This can either be a generic tool or one highly specialized to the particular application at hand (perhaps employing secret data associated with that application). In a second generation system (without too much fanfare) a fairly simple "remove watermark before analyzing this scene" function could be automatically included within analysis software such that 99% of image analysts wouldn't know or care about the watermarking on/off/on/off functionality as a function of use/transport.

As will be apparent, the technology detailed herein may be employed in reconnaissance and remote sensing systems, as well as in applications such as guidance of piloted or remotely piloted vehicles.

To provide a comprehensive disclosure without unduly lengthening this specification, applicant incorporates by reference, in their entireties, the disclosures of the above-cited patents and applications.

It should be understood that the technology detailed herein can be applied in the applications detailed in the cited DEM patents, as well as in other mapping and image (or audio or video or other content) asset management contexts. (Likewise, the technologies detailed in the cited patents can be advantageously used in embodiments according to the present invention.)

While particular reference was made to Digital Elevation Models and albedo maps, the same principles are likewise applicable to other forms of maps, e.g., vegetative, population, thermal, etc., etc.

While the illustrated embodiment correlated the incoming imagery with a projective image based on the master DEM/map, in other embodiments a reference other than the master DEM/map may be used. For example, a projection based just on part of the historical data from which the DEM/map was compiled can be used (e.g., one or more component data sets that are regarded as having the highest accuracy, such as based directly on ground truths).

Although not belabored, artisans will understand that the systems described above can be implemented using a variety of hardware and software systems. One embodiment employs a computer or workstation with a large disk library, and capable database software (such as is available from Microsoft, Oracle, etc.). The registration, watermarking, and other operations can be performed in accordance with software instructions stored in the disk library or on other storage media, and executed by a processor in the computer as needed. (Alternatively, dedicated hardware, or programmable logic circuits, can be employed for such operations.)

Certain of the techniques detailed above find far application beyond the context in which they are illustrated. For example, equipping an imaging instrument with an optical shutter that impart a watermark to an image finds application in digital cinema (e.g., in watermarking a theatrical movie with information indicating the theatre, date, time, and auditorium of screening).

In view of the wide variety of embodiments to which the principles and features discussed above can be applied, it should be apparent that the detailed embodiments are illustrative only and should not be taken as limiting the scope of the invention. Rather, I claim as my invention all such modifications as may come within the scope and spirit of the following claims and equivalents thereof. (For expository convenience, the term "map" as used in the claim should be construed to encompass terrain models, such as DEMs.)

I claim:

1. In a method of compiling satellite imagery and generating a map therefrom, an improvement comprising:

watermarking image data acquired by a satellite;

storing the watermarked image data in a database;

generating a map from the database; and watermarking the map.

2. A composite map formed from plural sets of component map data, characterized in that said plural sets of component map data each are encoded with a different watermark, each of said different watermarks encoding, or linking to, meta data associated with its respective component map data.

* * * * *